United States Patent [19]
Seyler

[11] Patent Number: 5,462,335
[45] Date of Patent: Oct. 31, 1995

[54] ADJUSTABLE LUMBAR SUPPORT FOR SEAT BACKS

[75] Inventor: Peter G. Seyler, Franklin Park, Ill.

[73] Assignee: Perfection Spring & Stamping Corp., Mt. Prospect, Ill.

[21] Appl. No.: 292,528

[22] Filed: Aug. 18, 1994

[51] Int. Cl.⁶ .................................................. A47C 7/46
[52] U.S. Cl. ................................. 297/284.4; 297/284.8
[58] Field of Search ........................... 297/284.4, 284.8, 297/284.11

[56] References Cited

U.S. PATENT DOCUMENTS

| | | | |
|---|---|---|---|
| 3,241,879 | 3/1966 | Castello et al. | 297/284.4 |
| 3,724,144 | 4/1973 | Schuster . | |
| 3,890,000 | 6/1975 | Easley . | |
| 4,295,681 | 10/1981 | Gregory . | |
| 4,339,150 | 7/1982 | McNamara et al. | 297/284.8 |
| 4,354,709 | 10/1982 | Schuster . | |
| 4,452,485 | 6/1984 | Schuster . | |
| 4,465,317 | 8/1984 | Schwarz . | |
| 4,469,374 | 9/1984 | Kashihara et al. | 297/284.4 |
| 4,556,251 | 12/1985 | Takagi . | |
| 4,576,410 | 3/1986 | Hattori . | |
| 4,632,454 | 12/1986 | Naert | 297/284.4 |
| 4,880,271 | 11/1989 | Graves . | |
| 5,011,223 | 4/1991 | Kato . | |
| 5,013,087 | 5/1991 | Nagasaka . | |
| 5,088,790 | 2/1992 | Wainwright et al. | 297/284.4 |

Primary Examiner—Peter R. Brown
Attorney, Agent, or Firm—Tilton Fallon Lungmus

[57] ABSTRACT

An adjustable lumbar support assembly, particularly suitable for the backs of vehicle seats, which is relatively simple in construction and which is durable, reliable and non-jamming in operation. The assembly includes a mounting bracket having laterally-spaced side portions defining a pair of aligned, horizontally-spaced channels which slidably receive a pair of glide blocks. A tensioned and outwardly-bowed leaf spring has its opposite end portions connected to the glide blocks, and an operating mechanism urges the blocks towards and away from each other to selectively adjust the curvature of the spring and the position of a lumbar support plate centrally connected to the spring. In a preferred embodiment, the operating mechanism includes a threaded shaft rotatably supported by the mounting bracket. A nut carried by the shaft is connected to the glide blocks by a flexible cable to shift those blocks, and thereby alter the curvature of the leaf spring, as the shaft is rotated in one direction or the other. Abutments provided by the shaft and stops provided by the nut abut each other to block further shaft rotation at the limits of travel of the nut. Most advantageously, the leaf spring has its ends connected to the glide blocks in a manner which promotes automatic release of the spring in response to applied forces of a magnitude sufficient to substantially reverse the curvature of the midportion of the spring as, for example, in the case of a severe rear end impact against a vehicle in which the assembly is mounted.

25 Claims, 3 Drawing Sheets

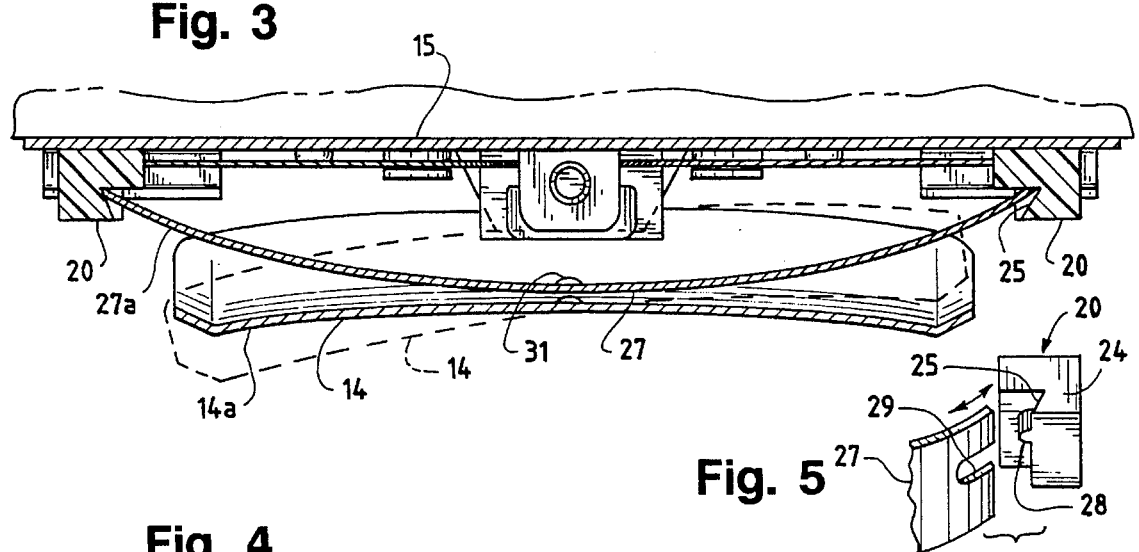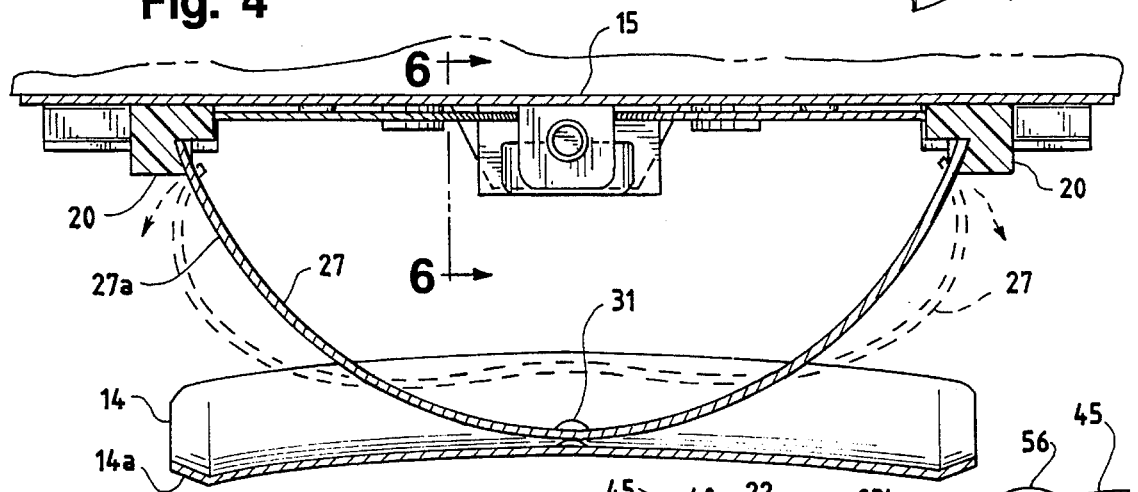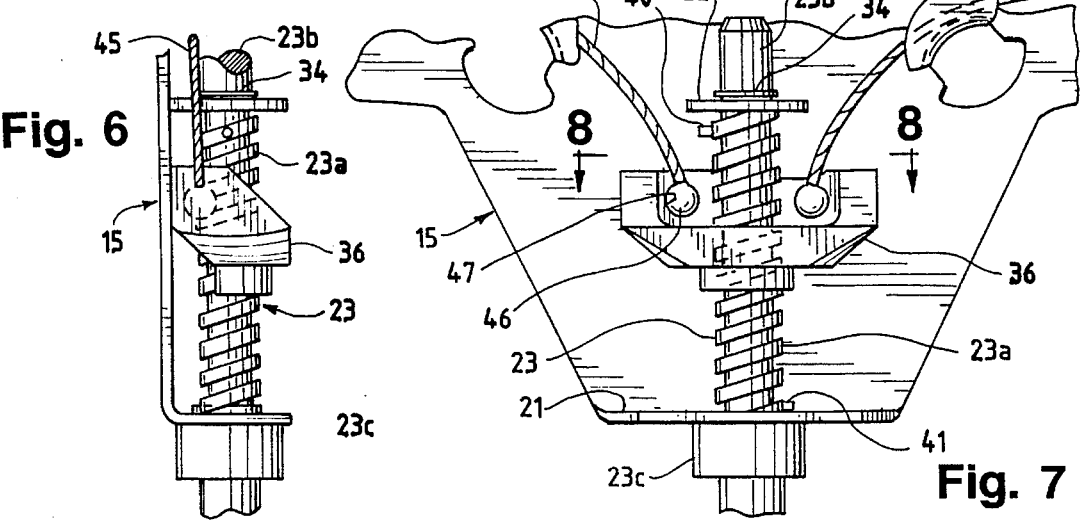

5,462,335

ADJUSTABLE LUMBAR SUPPORT FOR SEAT BACKS

BACKGROUND AND SUMMARY

Seat backs, particularly those of motor vehicles, are often equipped with power- or manually-operated mechanisms for adjusting the back's lumbar contour to suit passenger preference. Such adjustable lumbar supports have achieved popularity despite their complexity and relatively high cost, their tendency to jam or break in operation, and the difficulty and expense of their repair or replacement.

Another common shortcoming of current lumbar support assemblies is that while they may be capable of manual- or power-operated adjustment, they often lack the limited self-adjustability required for user comfort should, for example, an occupant shift in position and exert greater force against one side or the other of the seat back. Also, while increased lumbar support may be desirable for passenger/driver comfort over an extended interval, it may be undesirable in certain situations as, for example, when the localized force against an occupant's back is suddenly increased by reason of a severe rear end collision.

References indicative of the state of the art are U.S. Pat. Nos. 4,354,709, 4,295,681, 3,724,144, 5,088,790, 4,880,271, 4,452,485, 5,013,087, 5,011,223, 3,890,000, 4,465,317, 4,469,374, 4,556,251, and 4,576,410.

Important aspects of this invention lie in providing an adjustable lumbar support assembly that is relatively simple and inexpensive in construction, operates smoothly and reliably without risk of jamming, especially at the limits of its range of operation, is capable of limited self-adjustment when seated occupant shifts laterally, and is potentially self-releasing should forces in the lumbar region suddenly become excessive, as in the case of a severe rear-end impact against the occupant's vehicle.

Briefly, the assembly includes a mounting bracket adapted for connection to a seat back frame or, in the case of an integrated structure, a frame equipped with such a bracket. The bracket includes a pair of laterally-spaced side portions that define aligned, horizontally-spaced channels. A pair of glide blocks are mounted for horizontal sliding movement along the channels, and a curved, tensioned, horizontally-elongated leaf spring has its opposite ends operatively connected to the glide blocks with its mid-portion bowed away from the bracket. The bracket includes means for rotatably supporting a threaded shaft and means for operatively connecting the glide blocks and threaded shaft (e.g., a nut carried by the shaft and cables connecting the nut and glide blocks) for movement of the blocks towards and away from each other as the shaft is rotated in one direction or the other. A contoured back support plate is connected to the intermediate portion of the leaf spring, and control means, either manual or power-operated, is provided for selectively rotating the shaft for shifting the glide blocks to adjust the extent of curvature of the leaf spring.

The contoured back support plate is connected to the spring only along the mid-portion of the plate to allow limited movement of the plate's side portions towards and away from the spring in response to unequal loading against those side portions, thereby providing limited self-adjustment of the lumbar support assembly. Each of the glide blocks is provided with an undercut shoulder for receiving an end portion of the leaf spring and, should severe forces be generated that substantially reverse the curvature of the spring, as in the case of a rear-end impact, the ends of the spring are mounted to release from the undercut shoulders.

In a preferred embodiment, the threaded shaft of the adjustment mechanism is supported by the mounting bracket for rotation about a generally vertical axis, and the means for connecting the glide blocks and threaded shaft includes a nut carried by the shaft for movement between raised and lowered positions. Connecting means such as cables operatively connect the nut to each of the glide blocks for shifting the blocks towards and away from each other to alter the curvature of the spring as the shaft is rotated in one direction or the other.

Jamming at the extreme upper and lower positions of the nut is prevented by providing the threaded shaft with radially-extending abutment means at its upper and lower ends. The nut is also provided with radially-extending stop means, with such stop means being disposed directly in the path of rotational movement of the abutment means, to prevent, by direct and positive blocking or abutting action, continued rotation of the shaft in the same (non-reversing) direction when the nut reaches the upper or lower limits of its travel.

Other features, advantages, and objects of the invention will become apparent from the specification and drawings.

DRAWINGS

FIG. 1 is a perspective view of a seat back equipped with an adjustable lumbar support assembly of this invention, the cushioning of the back being partially cut away to reveal the lumbar support assembly.

FIG. 2 an exploded fragmentary perspective view illustrating components of the invention.

FIG. 3 is a horizontal sectional view showing the assembly in one position of adjustment and depicting in broken lines the extent of limited self-adjustment of the back support plate.

FIG. 4 is a sectional view similar to FIG. 3 but illustrating a second position of adjustment, with broken lines depicting changes in spring curvature under severe impact conditions that may result in automatic release.

FIG. 5 is a fragmentary detailed perspective view illustrating the interfitting relationship between a glide block and one end of the arcuate leaf spring.

FIG. 6 is a fragmentary vertical sectional view taken along line 6—6 of FIG. 4.

FIG. 7 is a fragmentary elevational view of the nut and screw mechanism with the nut being located in an intermediate position.

DETAILED DESCRIPTION OF PREFERRED EMBODIMENT

Figure 1:
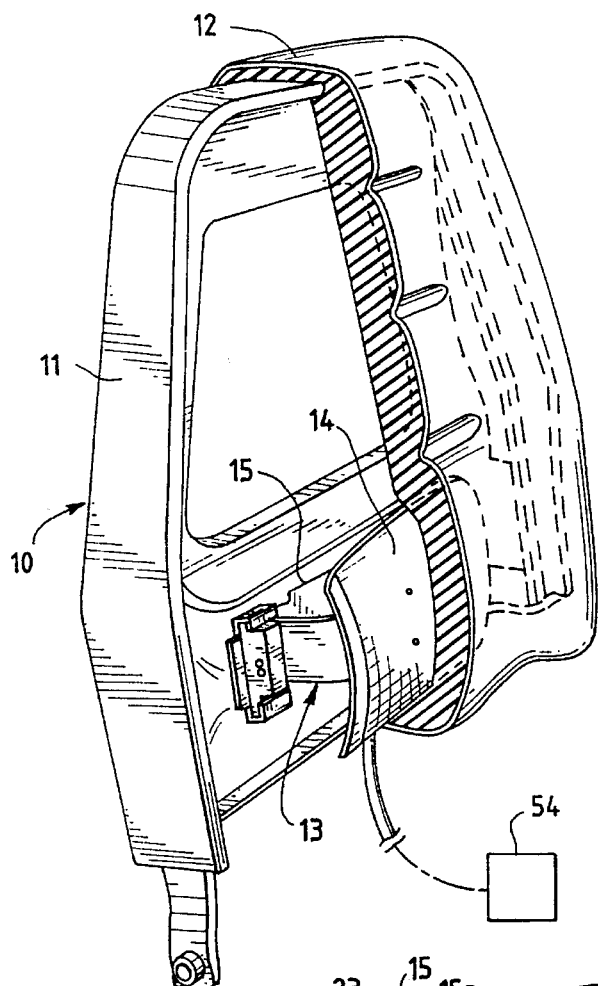

Referring to the drawings, the numeral 10 generally designates a seat back having a frame 11 and upholstered cushioning 12. A typical vehicle seat back is illustrated, but it is to be understood that the invention is also applicable to the backs of non-vehicular seats. Secured to the frame 11 is an adjustable lumbar support assembly 13 embodying this invention. The main elements of the assembly are interposed between frame 11 and cushioning 12, with a contoured back support plate 14 disposed directly behind, and in contact with, the cushioning in the lower (lumbar) region of the seat back.

Figure 2:
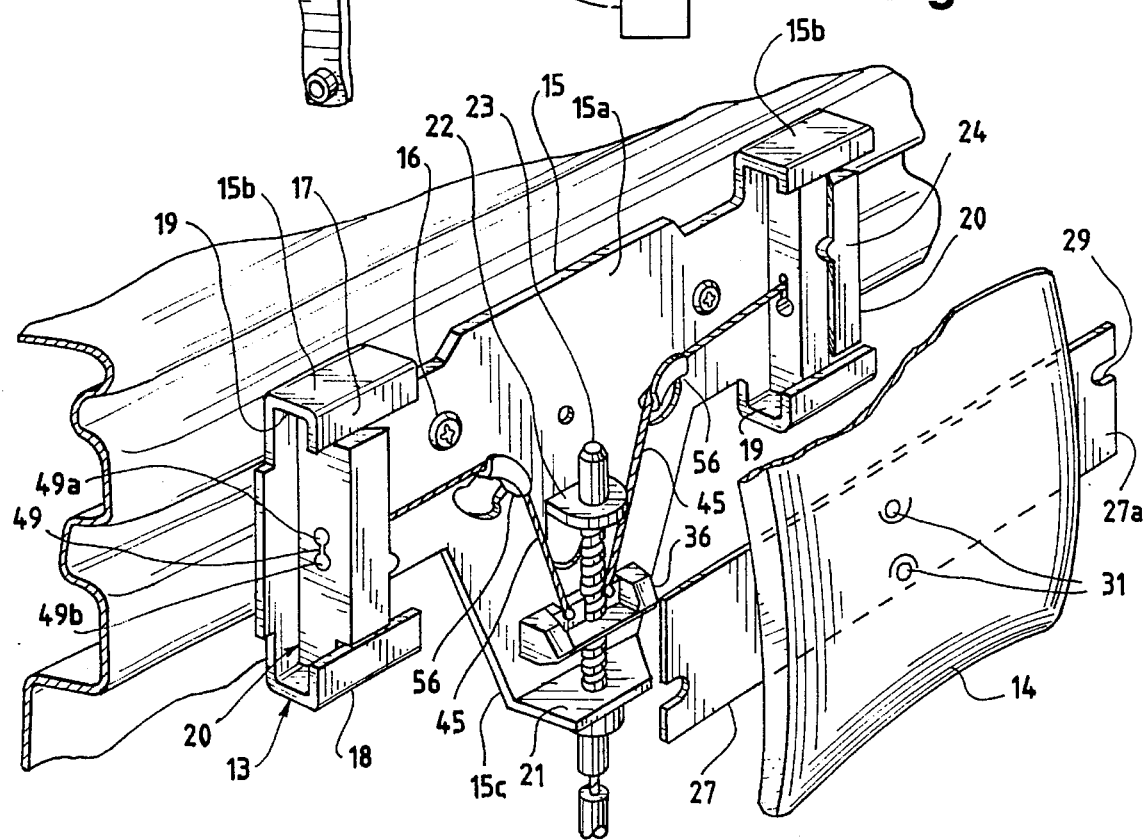

The primary components of the support assembly 13 are illustrated most clearly in FIG. 2. A mounting bracket 15 is connected by screws 16 or by any other suitable means to frame 11. The bracket is horizontally elongated and includes a central portion 15a and a pair of laterally-spaced side portions 15b. The side portions have upper and lower flanges 17 and 18, respectively, that define a pair of aligned, horizontally-spaced channels 19 at opposite ends of the bracket. A pair of glide blocks 20 are slidably received in the channels for limited sliding movement towards and away from each other.

The bracket also includes an integral extension 15c which projects away from intermediate portion 15a. In the illustration given, extension 15c extends downwardly and is provided at its lower end with an integral lower arm portion 21 that extends outwardly at right angles to the general plane of the bracket. A second arm portion 22 is spaced above arm portion 21, with the upper arm portion also being integral with the bracket and extending at right angles thereto. The upper and lower arm portions have aligned apertures for rotatably receiving the ends of a vertical shaft 23.

While the bracket and glide blocks may be formed of any suitable material, it has been found advantageous to form the bracket from steel and, for promoting smooth and noiseless sliding action, to fabricate the glide blocks of nylon or other tough, rigid, polymeric material. Each glide block is generally rectangular in outline with upper and lower portions slidably received in channels 19 and with a protruding shoulder 24 undercut at 25 (FIGS. 2, 5, and 10–12). The angular face of each undercut is shown in the drawings to extend along a plane disposed at an angle α of approximately 60° from the plane of sliding movement of the block (which is also the primary plane of mounting bracket 15), although other angles within the range of approximately 45° to 75° may be selected.

The recesses defined by the undercut shoulders 24 receive the end portions 27a of a leaf spring 27. The spring extends horizontally and is planar in an untensioned state, as depicted most clearly in FIG. 2. The spring is dimensioned so that when its end portions are received beneath the undercut shoulders 24, it will maintain an arcuate or bowed configuration throughout the full range of movement of the glide blocks. Thus, in FIG. 3, the blocks are shown in their outermost positions of adjustment with spring 27 being bowed away from bracket 15, whereas in FIG. 4, with the blocks in their innermost positions of adjustment, spring 27 remains bowed outwardly but its sharpness of curvature has substantially increased.

Figure 10:
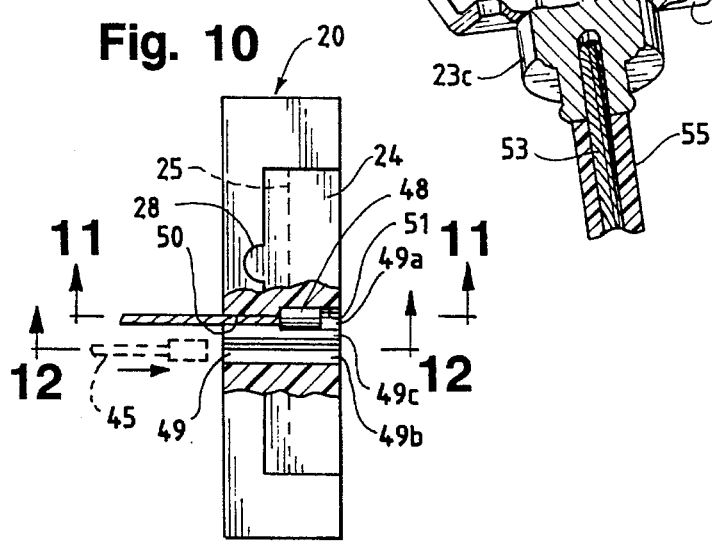
FIG. 10 is a plan view of a glide block, shown partly in section, and illustrating the interconnection between the block and its control cable.
Figures 11, 12:
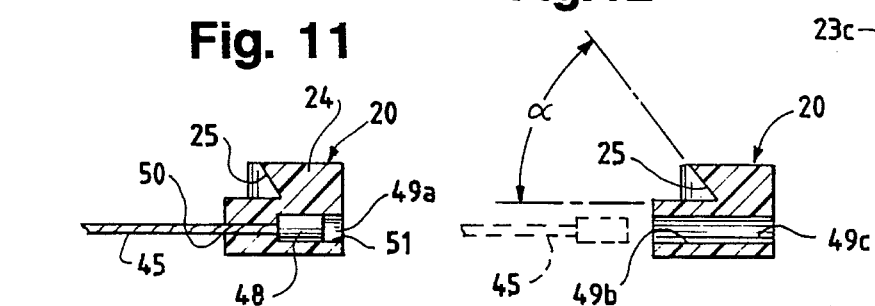
FIG. 11 is a sectional view taken along line 11—11 of FIG. 10.
FIG. 12 is a sectional view taken along line 12—12 of FIG. 10.

The spring is therefore under tension regardless of the positions of adjustment of glide blocks 20, and such tension effectively maintains the end portions of the spring within the undercut recesses 25, subject to automatic release under exceptional circumstances as will be described hereinafter. To insure that the ends of the spring will not slide upwardly or downwardly along the undercut recesses, each block is preferably formed with an integral lug 28 that is received in a notch 29 formed at each end of the spring blade (FIGS. 2, 5, 10).

The contoured back support plate 14 is generally rectangular in outline but has a compound curvature that generally conforms to the lumbar curvature of a seat occupant. Viewed in vertical section (or from the side), the plate is convexly curved away from bracket 15 (FIGS. 1, 2) but, viewed in horizontal section (or from above), the plate preferably has a gentle concave curvature facing away from bracket 15 (FIGS. 3, 4). It will be understood, of course, that such curvatures may be varied to provide a contour that conforms generally with the lower back configuration of most users. In any event, when viewed in horizontal section, lumbar support plate 14 and spring 27 diverge laterally from their points of connection along the vertical midlines of both the spring and plate. Specifically, the plate 14 is connected only along its vertical midline to the spring 27 by rivets 31 or other suitable connecting means. The side portions 14a of the plate are therefore spaced from the end portions 27a of the bowed spring under normal conditions of use of the assembly. Spring flexure allows limited rocking action of the plate, as indicated by broken lines in FIG. 3, and occurs automatically should a seat occupant shift position laterally in one direction or the other. Such rocking action promotes user comfort in those situations where the user's lower back is not centered directly in front of the lumbar support plate.

Figure 8:
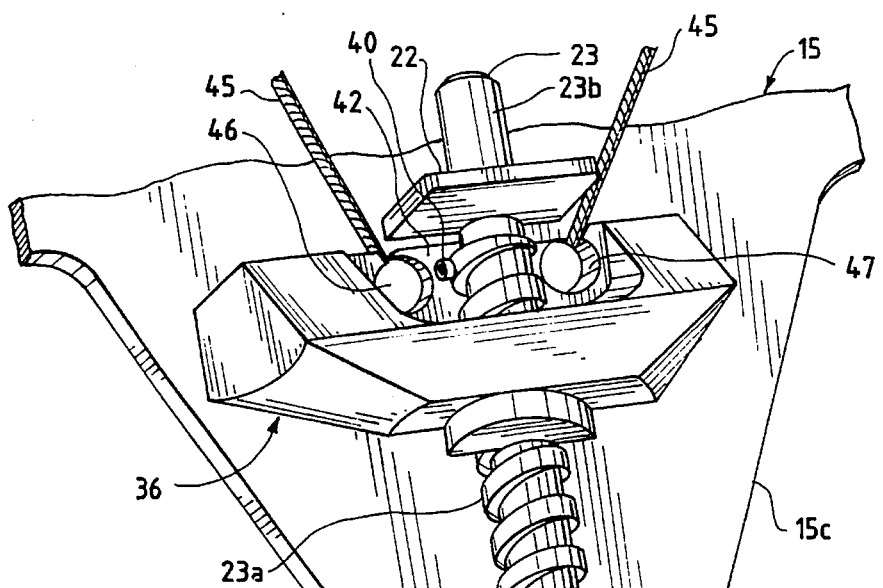
FIG. 8 is a fragmentary perspective view, partly in section, showing the relationship of parts when the nut is at the extreme upper end of its range of travel.

The adjustment mechanism includes shaft 23 which has a threaded intermediate portion 23a and unthreaded upper and lower end portions 23b and 23c, respectively. As previously noted, the upper and lower end portions are journaled in aligned openings provided by lower and upper bracket arms 21 and 22 (FIGS. 6–8). The shaft is retained against axial displacement by an enlarged lower end portions 23c and by a split retainer ring 34 (FIGS. 6, 7) received in retention groove 35 (FIG. 9) at the upper unthreaded end 23b of the shaft, although other means for constraining the shaft against axial movement while freely permitting shaft rotation may be provided.

Figure 9:
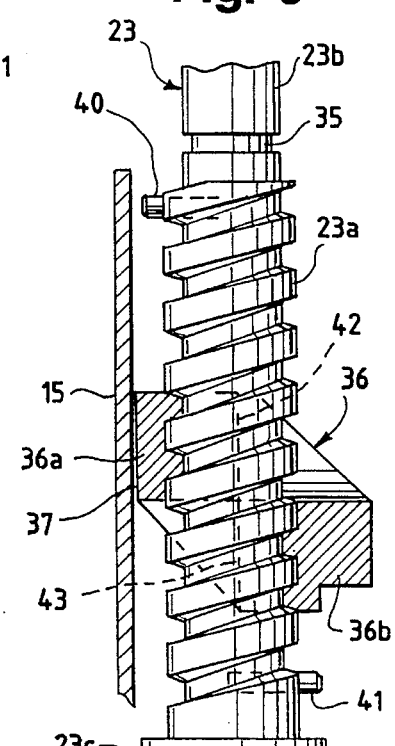
FIG. 9 is a vertical sectional view showing the relationship between the nut and threaded shaft.

A nut 36 of developed shape is carried by the threaded intermediate portion 23a of shaft 23. As shown in the drawings, particularly FIGS. 8 and 9, the nut is laterally extended and has a rear surface 37 that slidably engages the planar front surface of the mounting bracket 15. The nut may be molded from a rigid polymeric material such as polycarbonate, or cast from a metal such as aluminium and, to facilitate such molding or casting, the nut is provided with integral upper and lower portions 36a and 36b, respectively (FIG. 9). The upper portion 36b has a semi-cylindrical, forwardly-facing surface that is threaded to engage the rear half of shaft portion 23a, whereas the nut's lower portion 36b has a rearwardly-facing, semi-cylindrical threaded surface to engage the front half of the shaft.

Abutments in the form of radially-projecting pins 40 and 41 are provided by shaft 23 at the upper and lower ends of threaded portion 23a (FIG. 8). When the nut reaches the upper extent of its travel, the upper abutment 40 swings into engagement with stop surface 42 of the nut. Such engagement blocks further upward travel of the nut and occurs while slight spacing still exists between the top of the nut and the undersurface of bracket arm 22, as illustrated in FIG. 8. The blocking engagement between the radial projection or abutment 40 of the threaded shaft and the stop surface 42 of the nut prevents any possible overtightening that would otherwise occur if, instead of such blocking engagement, the nut were limited in its upward travel by contact with bracket arm 22.

Similarly, at the lower limit of nut travel, abutment or projection 41 rotates into engagement with stop surface 43 at the backside of the nut's lower portion 36b, such blocking action occuring while spacing remains between the undersurface of the nut and the lower arm 21 of bracket 15. Since the upper and lower limits of nut travel are determined by blocking actions by radial abutments provided by the shaft against radial stop surfaces provided by the nut, overtightening that might result in jamming or breakage is prevented.

The connecting means which operatively connects the nut 36 and each of the glide blocks 20 takes the form of flexible cables 45. The lower ends of the cables have enlargements 46 received in sockets 47 in the nut on opposite sides of shaft 23 (FIGS. 7, 8) and the upper ends of the cables are similarly provided with enlargements 48 received in openings 49 formed in each of the glide blocks. To facilitate assembly, each opening in a block takes the form of a pair of parallel bores 49a and 49b connected by a slit 49c having width slightly greater than the diameter of cable 45 and smaller than enlargement 48. Bore 49b is of uniform diameter slightly larger than that of enlargement 48, whereas bore 49a has a first portion 50 smaller than the enlargement and a second portion 51 slightly larger than such enlargement. Thus, the end of the cable with its enlargement may be inserted through the lower bore 49b and, after the enlargement has passed beyond block 20, the end of the cable may be shifted upwardly into the upper bore 49a and then reversed in direction to lock the enlargement and the end of the cable in the position as shown in solid lines in FIG. 10. It is to be understood, however, that while such a construction is disclosed as being a particularly effective way of detachably connecting the ends of cables 45 to the glide blocks 20 and to nut 36, other ways of achieving secure connections between these parts may be used.

The lower end 23c of shaft 23 is joined to one end of a flexible cable 53 (FIG. 8) with the opposite end of the cable operatively connected to suitable control means 54 for rotating the cable and threaded shaft. Such means 54 is diagramatically depicted in FIG. 1 and may take the form of a handle for manual operation or an electric (or hydraulic) motor for power operation. A sheath 55 encases the cable, as is well known in the art.

The cables 45 that cause glide blocks 20 to shift horizontally as nut 36 travels vertically extend about guides 56 formed integrally with projecting from mounting bracket 15 (FIGS. 2 and 7).

In operation, as nut 36 travels downwardly and upwardly, depending on the direction of rotation of the threaded shaft, the glide blocks move towards or away from each other to increase or decrease the flexure of leaf spring 27. FIGS. 3 and 4 represent the minimum and maximum curvatures of the spring when nut 36 is at the upper and lower limits of its travel. Force exerted by the body against plate 14 causes some flexure of the spring with the spring therefore providing a cushioning action as well as the laterally self-adjusting action already described and depicted by broken lines in FIG. 3. When the spring is adjusted to the condition of its sharpest curvature, it should be understood that the plate 14 of the lumbar support assembly is positioned forwardly to its maximum extent. To avoid injury that might possibly be caused by localized pressure against lumbar area of the back in the event of a severe rear-end impact, it will be observed from the broken lines in FIG. 4 that forces strong enough to produce a substantial reversal in the curvature of the central portion of the spring will also cause a reversal of slope at the ends of the spring with the result that at least one end will become disengaged in the manner indicated by the broken lines in that figure.

While in the foregoing, an embodiment of the invention has been disclosed in considerable detail for purposes of illustration, it will be understood by those skilled in the art that many of these details may be varied without departing from the spirit and scope of the invention.

I claim:

1. An adjustable lumbar support assembly for attachment to a seat back frame, comprising a mounting bracket adapted for connection to a seat back frame; said bracket including a central portion and a pair of laterally-spaced side portions defining a pair of aligned, horizontally-spaced channels; a pair of glide blocks mounted for horizontal sliding movement along said channels; a curved, horizontally-elongated leaf spring having a mid-portion bowed away from said bracket and having opposite end portions operatively connected to said glide blocks; said bracket including means for rotatably supporting a threaded shaft; means operatively connecting said glide blocks and threaded shaft for movement of said blocks toward and away from each other as said shaft is selectively rotated in one direction and in a direction opposite from said one direction; a contoured back support plate connected to said leaf spring intermediate the ends thereof; and control means for selectively rotating said shaft in opposite directions for shifting said glide blocks to adjust the extent of curvature of said leaf spring.

2. The assembly of claim 1 in which said control means comprises handle means operatively connected to said shaft for manually rotating said shaft in opposite directions.

3. The assembly of claim 1 in which said control means comprises electric power drive means operatively connected to said shaft for rotating said shaft in opposite directions.

4. The assembly of claim 1 in which said plate is connected to said spring only along a vertical mid-portion of said plate, thereby allowing limited movement of side portions of said plate towards and away from said spring in response to unequal loading against said side portions of said plate.

5. The assembly of claim 1 in which each of said glide blocks is provided with an undercut shoulder facing towards the other of said glide blocks for receiving said end portions of said leaf spring.

6. The assembly of claim 5 in which said ends of said leaf spring are releasable from said undercut shoulders in response to applied forces of a magnitude sufficient to reverse the curvature of said mid-portion of said spring.

7. The assembly of claim 1 in which each of said glide blocks is provided with an undercut shoulder facing towards the other of said glide blocks for receiving said end portions of said leaf spring; each of said glide blocks including lug means receivable in recesses at opposite ends of said spring for preventing said end portions from sliding along said undercut shoulders.

8. The assembly of claim 1 in which said threaded shaft is supported by said bracket for rotation about a generally vertical axis; said means for connecting said glide blocks and threaded shaft including a nut threadedly carried by said shaft for movement therealong between raised and lowered positions; means for preventing rotation of said nut as said shaft is rotated; and connecting means for operatively connecting said nut to each of said glide blocks for shifting said glide blocks towards and away from each other to flex and unflex said spring as said threaded shaft is rotated in opposite directions.

9. The assembly of claim 8 in which said means for preventing rotation of said nut comprises a surface of said central portion of said bracket in sliding engagement with a flat surface portion of said nut.

10. The assembly of claim 8 in which said threaded shaft has a threaded intermediate portion and unthreaded end portions; said shaft also having radially-extending abutment means adjacent opposite ends of said threaded intermediate portion; and radially-extending stop means provided by said nut; said stop means being disposed directly in the path of rotational movement of said abutment means to prevent, by positive non-jamming blocking action, continued rotation of said shaft in a non-reversing direction when said nut is at the upper and lower limits of its travel.

11. The assembly of claim 10 in which said nut includes upper and lower portions, each engaging the threads of said shaft along diametrically opposite but axially displaced portions of said threaded shaft.

12. The assembly of claim 10 in which said mounting bracket includes a pair of vertically-spaced upper and lower arms; said arms having vertically-aligned openings therein and said unthreaded end portions of said shaft being journaled in the openings of said arms.

13. The assembly of claim 12 in which said arms are formed integrally with said bracket.

14. The assembly of claim 1 in combination with a seat back frame; said mounting bracket being rigidly connected to said seat back frame.

15. An adjustable lumbar support assembly for attachment to a seat back frame, comprising a mounting bracket adapted for connection to a seat back frame; said bracket including a central portion and a pair of laterally-spaced side portions defining a pair of aligned, horizontally-spaced channels; a pair of glide blocks mounted for horizontal sliding movement along said channels; a curved, horizontally-elongated leaf spring having a mid-portion bowed away from said bracket and having opposite end portions operatively connected to said glide blocks; said central portion including means for rotatably supporting a threaded drive shaft extending generally vertically between said channels and glide blocks; a nut threadedly carried by said shaft for movement therealong between lowered and raised positions; means for preventing rotation of said nut as said shaft is rotated; connecting means for operatively connecting said nut to each of said glide blocks for shifting said glide blocks towards and away from each other to flex and unflex said spring as said threaded shaft is rotated in one direction or the other; a back support plate connected to said mid-portion of said leaf spring; and control means for rotating said shaft in opposite directions for selectively raising and lowering said nut and thereby shifting said glide blocks to adjust the extent of curvature of said spring.

16. The assembly of claim 15 in which said plate is connected to said leaf spring only along a vertical mid-portion of said plate, thereby allowing limited movement of side portions of said plate towards and away from said spring in response to unequal loading against said side portions of said plate.

17. The assembly of claim 15 in which each of said glide blocks is provided with an undercut shoulder facing towards the other of said glide blocks for receiving said end portions of said leaf spring.

18. The assembly of claim 17 in which said ends of said leaf spring are releasable from said undercut shoulders in response to applied forces of a magnitude sufficient to reverse the curvature of said mid-portion of said spring.

19. The assembly of claim 15 in which each of said glide blocks is provided with an undercut shoulder facing towards the other of said glide blocks for receiving said end portions of said leaf spring; each of said glide blocks including lug means receivable in recesses at opposite ends of said spring for preventing said end portions from sliding along said undercut shoulders.

20. The assembly of claim 15 in which said means for preventing rotation of said nut comprises a surface of said central portion of said bracket in sliding engagement with a flat surface portion of said nut.

21. The assembly of claim 15 in which said threaded shaft has a threaded intermediate portion and unthreaded end portions; said shaft also having radially-extending abutment means adjacent opposite ends of said threaded intermediate portion; and radially-extending stop means provided for by said nut; said stop means being disposed directly in the path of rotational movement of said abutment means to prevent, by positive non-jamming blocking action, continued rotation of said shaft in a non-reversing direction when said nut is at the upper and lower limits of its travel.

22. The assembly of claim 21 in which said nut includes upper and lower portions, each engaging the threads of said shaft along diametrically opposite but axially displaced portions of said threaded shaft.

23. The assembly of claim 21 in which said mounting bracket includes a pair of vertically-spaced upper and lower arms; said arms having vertically-aligned openings therein and said unthreaded end portions of said shaft being journaled in the openings of said arms.

24. The assembly of claim 23 in which said arms are formed integrally with said bracket.

25. The assembly of claim 15 in combination with a seat back frame; said mounting bracket being rigidly connected to said seat back frame.

* * * * *